Jan. 17, 1967     J. L. LEWIS     3,298,395

SEQUENCE VALVE

Filed Nov. 16, 1962     2 Sheets-Sheet 1

INVENTOR.
Jay L. Lewis
BY Birch and O'Brien
ATTORNEYS

Jan. 17, 1967  J. L. LEWIS  3,298,395
SEQUENCE VALVE
Filed Nov. 16, 1962  2 Sheets-Sheet 2

INVENTOR.
Jay L. Lewis
BY *Birch and O'Brien*
ATTORNEYS

United States Patent Office 3,298,395
Patented Jan. 17, 1967

3,298,395
SEQUENCE VALVE
Jay L. Lewis, Knoxville, Tenn., assignor to Robertshaw Controls Company, a corporation of Delaware
Filed Nov. 16, 1962, Ser. No. 238,220
6 Claims. (Cl. 137—607)

This invention relates to sequence valves and more particularly to sequence valves of the multiple inlet type.

It is an object of this invention to provide a balanced sequence valve having a predetermined dead zone in its operating cycle, wherein the dead zone is not affected by supply pressures.

It is another object of this invention to provide a balanced sequence valve having a single actuating stem adapted to be connected with a power actuator, wherein the pressure packings on said stem are subjected to downstream pressure only, within the valve body.

Still another object of this invention is to provide a balanced sequence valve having a plurality of valve poppets therein and novel biasing means for said valve poppets, whereby the dead zone of the sequence valve may be selectively adjusted with respect to the operating pressure of the said valve.

Yet another object of this invention is to provide a balanced sequence valve in which disassembly and installation are made possible under field conditions.

These and other objects of this invention will become more fully apparent with reference to the following specification and drawings, which relate to several preferred embodiments of the present invention.

Figure 1:
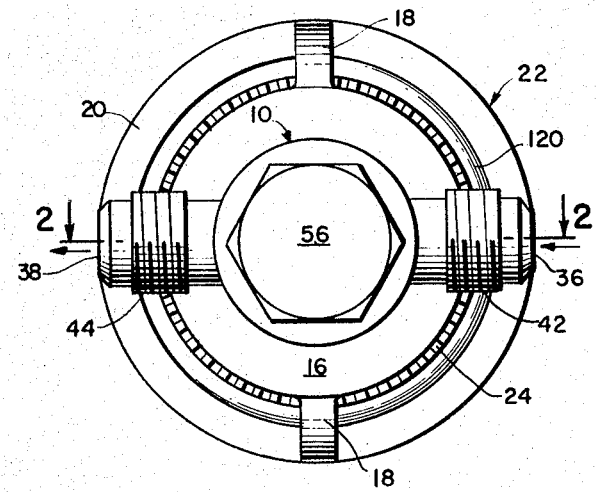
FIGURE 1 is a bottom end view of a valve and actuator combination embodying the present invention.
Figure 2:
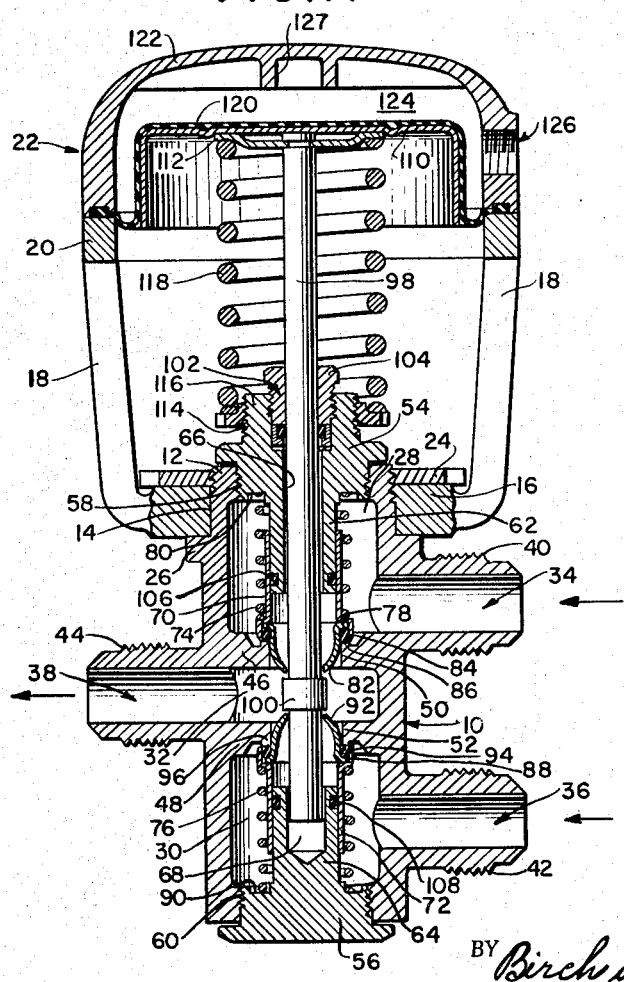
FIGURE 2 is a first embodiment of the invention in cross-section taken along line 2—2 of FIGURE 1.

Referring in detail to the drawings and more particularly to FIGURES 1 and 2, the sequence valve of the present invention is shown as including a hollow valve body 10, substantially cylindrical in shape, having the upper end 12 thereof externally threaded and extending through the central bore 14 of a grommet or sleeve portion 16 integrally mounted on the dependent arms 18 of the spider portion 20 of a valve actuator 22.

A sprocket-nut 24, cooperating with the threaded upper end 12 of the valve body 10, is provided with juxtaposition with the upper surface of the grommet 16 to draw an integral annular shoulder 26 on the valve body 10 into positive engagement with the lower surface of the grommet 16. Thus, the valve body 10 and valve actuator 22 are positively interlocked to form an integral structure.

The valve body contains first and second inlet chambers 28 and 30, respectively, separated by an outlet chamber 32. First and second inlet ports 34 and 36, respectively, are provided for the first and second inlet chambers 28 and 30, respectively. An outlet port 38 is provided for the outlet chamber 32. And, each of the first and second inlet ports 28 and 30 and the outlet port 38 are provided with externally threaded pressure couplings 40, 42 and 44, respectively.

The outlet chamber 32 is defined by first and second internal webs or bulkheads 46 and 48 which also define one end of the first and second inlet chambers 28 and 30, respectively. The said first and second bulkheads are provided with first and second flow ports 50 and 52, respectively, the first and second flow ports 50 and 52 being coaxially disposed for a purpose to be hereinafter described.

The opposite ends of the first and second inlet chambers 28 and 30 are defined, respectively, by a top end cap 54 and a bottom end cap 56 which are inserted, respectively, in threaded bores 58 and 60 in the top and bottom, respectively, of the valve body 10.

The top and bottom end caps 54 and 56, respectively, include reduced-diameter, coaxial, extended portions 62 and 64, respectively, which protrude into the first and second inlet chambers 28 and 30, respectively.

The top end cap 54 is provided with a coaxial bore 66, which is mutually coaxial with the first and second flow ports 50 and 52, respectively, and a coaxial bore 68 extending partially through the bottom end cap 64 from the inner end thereof.

First and second hollow cylindrical valve poppets 70 and 72, respectively, are telescopically fitted over the extended portions 62 and 64, respectively, on the top and bottom end caps 54 and 56. The said valve poppets are biased away from the said end caps by first and second, externally disposed, compression springs 74 and 76, respectively.

The first valve poppet 70 is provided with an annular shoulder 78 against which the first compression spring 74 is seated, the other end of the said spring being seated in a circular groove 80 in the top end cap 54. A lower tip portion 82 and an annular seating ring 84 are crimped together with the annular shoulder 78 to form a valve head structure. The annnular seating ring 84 is adapted to seat against a raised annular valve seat 86, around the first flow port 50, on the inlet or upstream side of the first bulkhead 46.

The second valve poppet 72 is provided with an annular shoulder 88 against which the second compression spring 76 is seated, the other end of the said spring being seated in a circular groove 90 in the bottom end cap 56. An upper tip portion 92 and annular seating ring 94 are crimped together with the annular shoulder 88 to form a valve head structure. The annular seating ring 94 is adapted to seat against a raised annular valve seat 96, around the second flow port 52, on the inlet or upstream side of the second bulkhead 48.

A valve actuator shaft 98 is provided which extends through the bore 66 in the top end cap 54, tip portion 82 of the first valve poppet 70, tip portion 92 of the second valve poppet 72 and into the bore 68 in the lower end cap 56. An annular integral contact shoulder 100 is provided on the actuator shaft 98 intermediate the said tip portions 82 and 92 of the valve poppets 70 and 72, respectively, and is adapted to alternately contact the said tip portions.

A shaft packing assembly 102 including a gland nut 104 is provided at the outer end of the bore 66 in the top end cap 54 whereby the actuator shaft is both sealed and journalled.

The first and second valve poppets 70 and 72 are sealed on the respective extensions 62 and 64 of the top and bottom end caps 54 and 56, by means of, respectively, first and second O-rings 106 and 108 mounted in annular slots in the said extensions. Because of the relative dimensions of the said valve poppets, the O-rings 106 and 108 seal on the inner walls of the respective poppets on the same diameter as the inner peripheries of the annular valve seats 86 and 96, respectively.

The actuator shaft 98 extends above the top end cap 54 to a position immediately adjacent the outer wall of an actuator piston 110 in the valve actuator 22. A removable footing or end plate 112 is clipped onto the actuator shaft 98 to provide a substantial area of contact against the piston 110.

The upper end of the top end cap 54 contains a peripherally threaded portion 114 which adjustably receives a sprocket nut 116. Both the sprocket nut 116 and the footing 112 on the actuator shaft 98 are of stepped cross-section, whereby a helical compression spring 118, concentric with the actuator shaft 98, may be contained therebetween to bias the piston 110 and actuator shaft 98 inwardly with respect to the valve actuator 22.

A motor diaphragm 120 is draped over the piston 110 and secured peripherally to the upper housing section 122 of the valve actuator 22 to define an expansible motor chamber 124 therein. A suitable pressure inlet 126 is provided for connecting a source of actuating pressure, not shown, to the said motor chamber 124. A bifurcated boss 127 is provided in the chamber 124 to limit the innermost position of travel of the piston 110.

Figure 3:
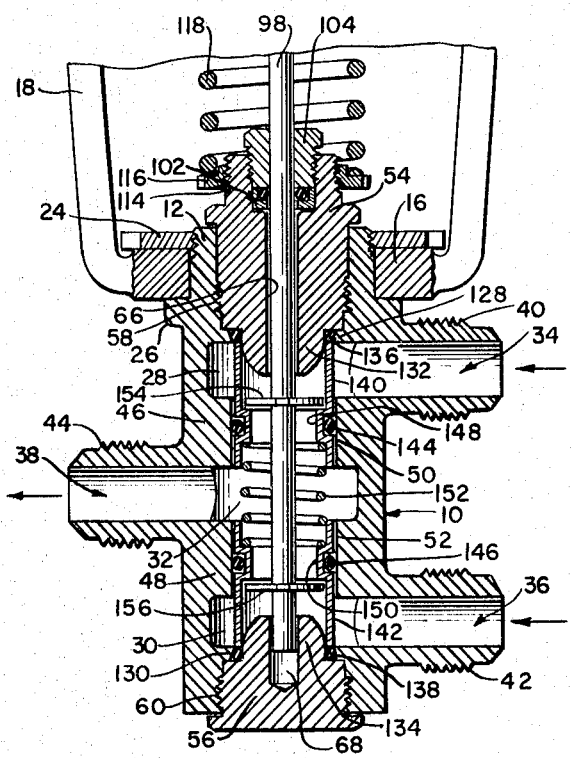
FIGURE 3 is a second embodiment of the invention shown on the same cross-section as the embodiment of FIGURE 2.

Referring now to FIGURE 3, wherein like parts to the embodiment of FIGURE 2 bear like numerals, a second embodiment of the invention will now be described.

The top and bottom end caps 54 and 56, respectively, abut at their inner ends against first and second annular bosses 128 and 130, respectively, which cooperate with respective reduced diameter extensions 132 and 134 on the said end caps to form an annular retaining cavity for resilient annular first and second valve seats 136 and 138, respectively.

First and second cylindrical, open-ended valve poppets 140 and 142, respectively, are provided in the flow ports 50 and 52, respectively, and are slidably received therein. Annular sealing rings 144 and 146, respectively, are provided on the valve poppets 140 and 142 and are maintained thereon in juxtaposition with the walls of the flow ports 50 and 52, respectively, by means of annular grooves defined by upset portions 148 and 150, respectively, in the poppets.

As shown, the upper end of the first valve poppet 140 and the lower end of the second valve poppet 142 are adapted, respectively, to seat against the first and second annular valve seats 136 and 138. In order to provide the said poppets with a normally closed operating function, a helical compression spring 152 is provided which is common to both of said poppets and constrained between the innermost shoulders of the upset portions 148 and 150 of the respective poppets 140 and 142, and concentrically disposed with respect to the actuator shaft 98.

Means to actuate the first and second valve poppets 140 and 142, are provided in the form of first and second symmetrically cruciform contactors 154 and 156, respectively, mounted at their centers on the actuator shaft 98 and adapted to contact, respectively, the outermost shoulders of the upset portions 148 and 150 on the respective valve poppets.

Operation

With joint reference to FIGURES 2 and 4, the operation of the embodiment of FIGURE 2 will now be described.

Assuming first that no acutating pressure is being supplied, via the pressure inlet 126, to the motor chamber 124 of the valve actuator 22, the return spring 118 will force the piston 110 and diaphragm 120 into juxtaposition with the bifurcated boss 127 in the chamber 124. This will cause the annular contact shoulder 100 on the shaft 98 to engage the head portion 82 of the first valve poppet 70 and displace the said poppet vertically upward, as shown, whereby the annular seating ring 84 is unseated from the annular valve seat 86. Pressure medium is thus permitted to flow from the first inlet chamber 28, through the first flow port 50 in the first bulkhead 46 into the outlet chamber 32.

For the purposes of this description it is also assumed that the first and second inlet ports 34 and 36 and their respective couplings 40 and 42 are connected to suitable sources of pressure medium such as, for example, heating medium and cooling medium, respectively. In keeping with this example, the outlet port 38 and its coupling 44 may be assumed to be connected to the inlet of a summer-winter heat exchanger which alternately utilizes the heating and cooling mediums.

Figure 4:
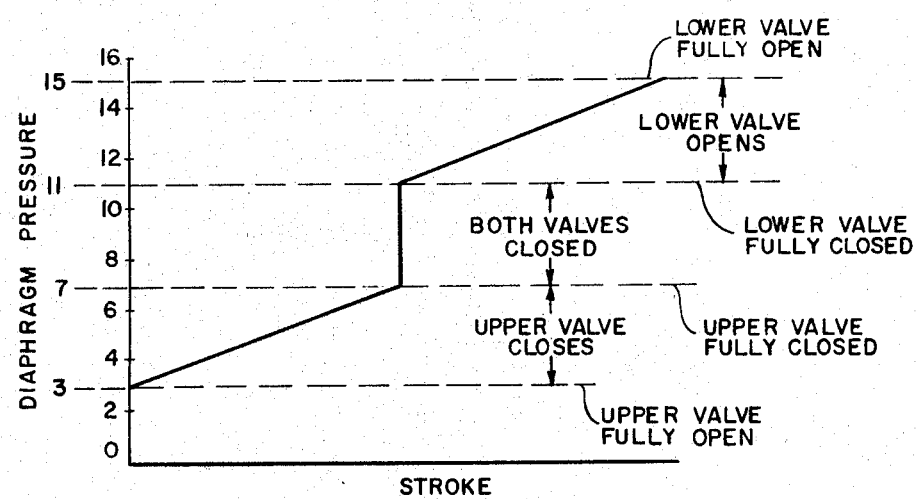
FIGURE 4 is a graphic representation of a stroking characteristic of a valve embodying the present invention.

Assuming, as per FIGURE 4, that up to 3 p.s.i. is required in the motor chamber 124 to overcome static spring forces, the upper or first valve poppet 70 will begin to close if the pressure introduced to chamber 124 exceeds 3 p.s.i. As shown in FIGURE 4, an increase to 7 p.s.i. will cause the piston 110 to move downwardly, away from the boss 127, to a position wherein the annular seating ring 84 will again seat on the annular valve seat 86, closing the first flow port 50. At this point in the stroke function of the actuator shaft 98, both the first and second flow ports 50 and 52, respectively, will be in closed position and the annular contact shoulder 100 will be positioned intermediate the head portions 82 and 92, respectively, of the first and second valve poppets 70 and 72.

The entire valve assembly is now in the dead zone or dwell period of the stroke function of the actuator shaft 98, since, as shown in FIGURE 4, an increase in actuating pressure in the motor chamber 124 of the valve actuator 22 from 7 p.s.i. to 11 p.s.i. produces no change in the closed conditions of both the first and second flow ports 50 and 52, respectively.

Now, if the actuating pressure in the motor chamber 124 is increased above 11 p.s.i., then the diaphragm 120, piston 110 and actuator shaft 98 will move against the combined force of the return spring 118 and the second valve spring 76, forcing the lower or second valve poppet 72 downward, as shown, via the action of the annular contact shoulder 100 against the second valve head portion 92. Thus, the second annular seating ring 94 will be unseated from the annular valve seat 96 and the second flow port 52 in the second bulkhead 48 will be opened, permitting pressure medium to flow from the second inlet chamber 30 into the outlet chamber 32.

It will also be evidenced from the stroke function shown in FIGURE 4, that flow rates through each of the first and second flow ports 50 and 52 may be modulated by varying the actuating pressure in the motor chamber 124 over the pressure range in which the respective flow ports are in an open condition. As specifically illustrated, a 4 p.s.i. control range is provided for each of the said flow ports and their associated valve poppets.

Referring now to FIGURE 3, wherein the operating cycle and stroke characteristic of the embodiment of FIGURE 3 are similar to those of the embodiment of FIGURE 2, and again to FIGURE 4, the operation of the embodiment of FIGURE 3 will now be described.

As shown, both the first and second cruciform contactors 154 and 156, respectively, on the actuator shaft 98, are out of contact with the respectively associated upset portions 148 and 150 of the first and second valve poppets 140 and 142, respectively. Thus, the sequence valve of the present invention is in the dead zone wherein both the first and second flow ports 50 and 52, respectively, are fully closed; the first and second poppets 140 and 142 being seated, respectively, against the first and second seating rings 136 and 138.

A reduction of pressure in the motor chamber 124 of the actuator 22, as shown in FIGURE 2 and previously described in conjunction therewith, causes the piston return spring 118 to force the actuator shaft 98 upward and thus, cause the second or lower cruciform contactor 156 to act upwardly on the upset portion 150 of the second valve poppet 142 to thereby force the said poppet 142 away from the second seating ring 138 and permit pressure medium to flow from the second inlet chamber 30 into the outlet chamber 32, via the second flow port 52 internally of the said second valve poppet 142.

Again assuming the sequence valve to be initially in the dead zone, an increase in actuating pressure in the actuator 22 causes the actuator shaft 98 to be driven downwardly against the action of the return spring 118. This causes the first cruciform contactor 154 to act downwardly on the upset portion 148 of the first valve poppet 140, to thereby force the said poppet 140 away from the first seating ring 136 and permit pressure medium to flow from the first inlet chamber 28 into the outlet chamber 32, via the first flow port 50 internally of the said first valve poppet 140.

In both of the embodiments described herein, the shaft packing assemblies 102 for the actuator shafts 98 are only subject to downstream pressure, that is, exposed to pressure only when one of the valve poppets is actuated to open one of the first and second flow ports 50 and 52. Thus, no undue strain is placed on the shaft packings and the strength requirements and expense of these assemblies are substantially lessened. Should replacement of the packing assemblies 102 be necessary, it is not necessary to shut off either of the supply lines connected to ports 34 and 36 since the valve poppets automatically assume their dead zone position when the actuator 22 is removed.

In addition, since the pressure in the inlet chambers acts only laterally on the respective valve poppets therein, the sequence valve of the present invention, in both embodiments, is balanced and unaffected by variations in pressure between the first and second inlet chambers 28 and 30, respectively.

Furthermore, the balanced valve construction provided by the present invention precludes actuator stem thrusts which might harm the valve actuator and thus, the valve actuator 22 hereinbefore described may be of much less costly construction than would ordinarily be possible with prior known sequence valves.

Still further, the embodiment of FIGURE 2 provides individual valve springs 74 and 76, respectively, for the first and second valve poppets 70 and 72. This provides a means for selectively varying the pressure necessary to operate the valves in the device by substituting springs of different rates, see FIGURE 4.

Finally, this invention provides a sequence valve assembly wherein the end caps 54 and 56, herein described, may be readily removed and all of the seating rings and other resilient sealing and seating parts in the valve body 10 are readily accessible and interchangeable.

It is to be understood that the embodiments of this invention, as shown and described herein, are for the purposes of example only and are not intended to limit the scope of the appended claims.

What is claimed is:

1. A sequence valve comprising first and second inlet means, outlet means, first and second valve means interconnecting, respectively, said inlet means with said outlet means, common actuating means for said valve means having a predetermined operating stroke, contact means on said actuating means, cooperating means on each of said valve means adapted to be engaged by said contact means, said contact means being so spaced with respect to each of said cooperating means as to be simultaneously disengaged from both of said cooperating means over a predetermined portion of said operating stroke of said actuating means to thereby form a dead zone in the operating sequence of said sequence valve, and biasing means for said valve means, whereby said valve means are maintained in a normally closed condition, said sequence valve further including a valve body containing said inlet, outlet and valve means, said valve body being open at both ends, first and second end caps in the ends of said valve body, inward coaxial extensions on said end caps, and bore means in said end caps for coaxially receiving a portion of said common actuating means; and wherein said first and second hollow valve poppets, respectively, are telescopically mounted with respect to said inward coaxial extensions on said first and second end caps, respectively, said poppets and said flow ports being coaxially disposed with respect to a portion of said common actuating means, and annular seating means on each of said valve poppets for closing said first and second flow ports in response to the position of said actuating means.

2. The invention defined in claim 1, wherein said common actuating means comprises motor means and shaft means driven by said motor means over a predetermined stroke, said contact means being mounted on said shaft means adjacent said first and second valve means.

3. The invention defined in claim 2, wherein said valve means are in opposition and wherein said contact means comprises an enlarged annular collar on said shaft means, located intermediate said valve means.

4. The invention defined in claim 2, wherein said valve means are in opposition and wherein said contact means comprises first and second contactors on said shaft means adjacent said first and second valve means, respectively.

5. A sequence valve comprising first and second inlet means, outlet means, first and second valve means interconnecting, respectively, said inlet means with said outlet means, common actuating means for said valve means having a predetermined operating stroke, contact means on said actuating means, cooperating means on each of said valve means adapted to be engaged by said contact means, said contact means being so spaced with respect to each of said cooperating means as to be simultaneously disengaged from both of said cooperating means over a predetermined portion of said operating stroke of said actuating means to thereby form a dead zone in the operating sequence of said sequence valve, and biasing means for said valve means, whereby said valve means are maintained in a normally closed condition, said first and second valve means comprising, respectively, first and second flow ports, first and second hollow valve poppets, respectively, cooperating with said flow ports, said poppets and said flow ports being coaxially disposed with respect to a portion of said common actuating means, and annular seating means on each of said valve poppets for closing said first and second flow ports in response to the position of said actuating means, said sequence valve further including a valve body containing said inlet, outlet and valve means, said valve body being open at both ends, first and second end caps in the ends of said valve body, inward coaxial extensions on said end caps, and bore means in said end caps for coaxially receiving a portion of said common actuating means; wherein said first and second hollow valve poppets, respectively, are telescopically mounted with respect to said inward coaxial extension on said first and second end caps; wherein said annular seating means comprises annular ring means on each of said valve poppets for closing said first and second flow ports in response to the position of said actuating means; and first and second annular valve seats on the inlet side of said first and second flow ports, respectively; and wherein said annular seating ring means on said valve poppets are adapted to engage, respectively, said annular valve seats, said ring means being located intermediate the ends of said valve poppets, whereby said poppets extend downstream in said flow ports when said first and second valve means are closed, thereby exposing said valve poppets to only lateral pressure upstream of said flow ports.

6. A sequence valve comprising first and second inlet means, outlet means, first and second valve means interconnecting, respectively, said inlet means with said outlet means, common actuating means for said valve means having a predetermined operating stroke, contact means on said actuating means, cooperating means on each of said valve means adapted to be engaged by said contact means, said contact means being so spaced with respect to each of said cooperating means as to be simultaneously disengaged from both of said cooperating means over a predetermined portion of said operating stroke of said actuating means to thereby form a dead zone in the operating sequence of said sequence valve, and biasing means for said valve means, whereby said valve means are maintained in a normally closed condition, said first and second valve means comprising, respectively, first and second flow ports, first and second hollow valve poppets, respectively, cooperating with said flow ports, said poppets and said flow ports being coaxially disposed with respect to a portion of said common actuating means, and annular seating means on each of said valve poppets for closing said first and second flow ports in response to the position of said actuating means, said sequence valve further including a valve body containing said inlet, outlet and valve means, said valve body being open at both ends, first and second end caps in the ends of said valve body, inward coaxial extensions on said end caps, and bore means in said end caps for coaxially receiving a portion of said common actuating means; wherein said first and second hollow valve poppets, respectively, are telescopically mounted with respect to said inward coaxial extensions on said first and second end caps; wherein said sequence valve further includes first and second annular valve seats on said first and second end caps, respectively, adjacent the base of said inward coaxial extensions; said annular seating means on said valve poppets comprising the end periphery thereof adjacent said end caps, respectively; and wherein, said valve poppets are internally telescopic with respect to said first and second flow ports, whereby, when said first and second valve means are closed, said poppets are exposed to only lateral pressure upstream of said flow ports.

References Cited by the Examiner

UNITED STATES PATENTS

| | | | |
|---|---|---|---|
| 951,161 | 3/1910 | Watrous | 137—636.1 |
| 1,143,999 | 6/1915 | Rosencrans | 151—282 |
| 2,537,094 | 1/1951 | Schmidlen | 137—115 |
| 2,919,716 | 1/1960 | Boyer | 137—636 |
| 3,025,881 | 3/1962 | Freeman | 137—627.5 |

ALAN COHAN, *Primary Examiner.*

WILLIAM F. O'DEA, *Examiner.*

D. LAMBERT, *Assistant Examiner.*